United States Patent
Humphrey et al.

(10) Patent No.: US 10,396,652 B1
(45) Date of Patent: Aug. 27, 2019

(54) CONTROLLED POWER ADJUSTMENTS

(71) Applicant: Hewlett Packard Enterprise Development LP, Houston, TX (US)

(72) Inventors: Daniel Humphrey, Tomball, TX (US); Mark Isagani Bello Rivera, Cypress, TX (US); Stewart Gavin Goodson, II, Houston, TX (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 0 days.

(21) Appl. No.: 15/964,490

(22) Filed: Apr. 27, 2018

(51) Int. Cl.
*H02M 1/12* (2006.01)
*H02M 1/42* (2007.01)

(52) U.S. Cl.
CPC .............. *H02M 1/12* (2013.01); *H02M 1/42* (2013.01)

(58) Field of Classification Search
CPC ............. H02M 1/12; H02M 1/15; H02M 1/42
See application file for complete search history.

(56) References Cited

U.S. PATENT DOCUMENTS

| | | | |
|---|---|---|---|
| 4,090,088 A * | 5/1978 | McMahon | H02J 3/14 307/38 |
| 6,181,583 B1 | 1/2001 | Okui et al. | |
| 7,804,280 B2 | 9/2010 | Deaver et al. | |
| 8,450,878 B2 | 5/2013 | Rada et al. | |
| 8,665,618 B2 | 3/2014 | Kravitz | |
| 8,803,361 B2 | 8/2014 | Johansen et al. | |
| 9,691,111 B2 * | 6/2017 | Ree | G06Q 50/06 |
| 2014/0115357 A1 * | 4/2014 | Li | G06F 1/3234 713/320 |
| 2015/0145325 A1 | 5/2015 | Mir et al. | |
| 2016/0211703 A1 * | 7/2016 | Eguchi | H04B 5/0037 |
| 2016/0241040 A1 * | 8/2016 | Kusunose | H02J 3/382 |
| 2017/0275799 A1 * | 9/2017 | Chen | D05B 69/18 |

FOREIGN PATENT DOCUMENTS

EP   1229633   8/2002

OTHER PUBLICATIONS

ABB; "Power Factor Correction and Harmonic Filtering in Electrical Plants"; Oct. 27, 2008; 62 pages.

* cited by examiner

*Primary Examiner* — Matthew V Nguyen
(74) *Attorney, Agent, or Firm* — Hewlett Packard Enterprise Patent Department (57) ABSTRACT

The examples include methods and apparatuses to control power adjustments. Controlling power adjustments can include receiving, from the sensor, a measurement of the power, comparing the measurement of the power to a pre-defined threshold, responsive to determining that the measurement is outside the scope of the threshold, calculating an adjustment to the consumption of the power by a load, and providing the adjustment to a power supply of the load to adjust the power consumed by the power supply.

19 Claims, 5 Drawing Sheets

CONTROLLED POWER ADJUSTMENTS

BACKGROUND

Systems and devices can receive power from a utility. The power can be received at a transformer. The transformer can provide the power to a plurality of loads.

DETAILED DESCRIPTION

Different harmonic and power factor profiles can be generated based on a load's power consumption. For examples, air conditioners, uninterrupted power supplies (UPSs), servers, storage devices, and/or network switches can have varied harmonic and power factor profiles.

As used herein, a harmonic is a multiple of a fundamental frequency that describes a voltage and a current of an electric power system. Harmonics are generated by non-linear electric loads. Harmonics in a power system can result in increased heating and malfunction in equipment that processes and/or consumes the power provided by a power system including a utility system and/or a generator system, among other power systems.

A power factor is a ratio between the real power flowing to a load and the apparent power in the circuit. That is, the power factor describes an efficiency at which the energy provided is utilized.

Utility companies may incentivize purely resistive loading to minimize the overall energy delivery cost. The costs associated with delivering energy can be based on harmonics and/or power factors, among other variables that can contribute to energy delivery costs. A utility customer may receive discounts from the utility company as an incentive to present better power factors and/or harmonic content. Power infrastructure devices with higher power factors and reduced harmonic content can be utilized at higher levels than power infrastructure devices with lower power factors and/or increased harmonic content.

The costs associated with delivering energy can be reduced in different ways. For example, costs can be reduced by utilizing high performing power supplies to minimize harmonics and maximize a power factor. Utilizing a double converter online UPS can mask issues after the UPS. Costs can also be reduced by installing harmonic mitigating transformers which can either cancel out harmonics or phase shift harmonics.

However, these solutions may not reduce costs in a general sense and may be uniquely customized to a particular data center. In addition, mitigating air conditioners, chillers, pumps or any other highly inductive load may be very difficult with the stated solutions.

In a number of examples, energy delivery costs can be mitigated by controlling the consumption of power. The consumption of power can be controlled by providing commands to loads that change the way the loads consume power.

The figures herein follow a numbering convention in which the first digit corresponds to the drawing figure number and the remaining digits identify an element or component in the drawing. Elements shown in the various figures herein can be added, exchanged, and/or eliminated to provide a number of additional examples. In addition, the proportion and the relative scale of the elements provided in the figures are intended to illustrate the examples described and should not be taken in a limiting sense.

Figure 1:
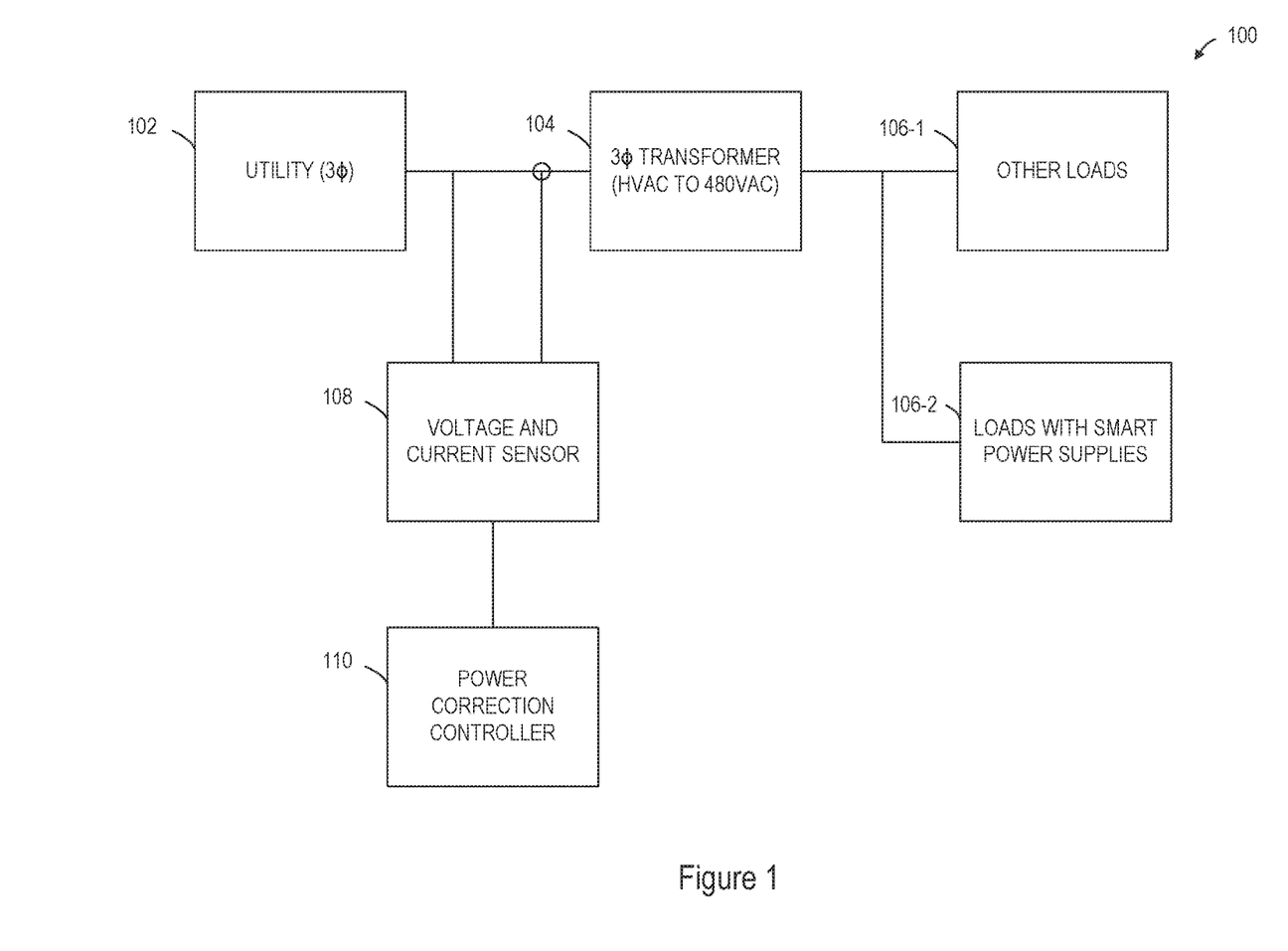
FIG. 1 illustrates an example of a system for adjusting power consumption utilizing controlled power adjustments consistent with the disclosure.

FIG. 1 illustrates an example of a system 100 for adjusting power consumption utilizing controlled power adjustments consistent with the disclosure. The system includes a utility 102, a transformer 104, loads 106-1 and 106-2, a voltage and current sensor 108, and a power correction controller 110.

The utility 102 can include infrastructure that provides power. The utility 102 can provide power. For example, the utility 102 can provide three-phase (3φ) power or power with a different phase including fewer or more phases than three. Although the examples provided herein are given in the context of three-phases, the examples also apply to other phases. The utility 102 can include public infrastructure and/or private infrastructure. For example, the utility can be a public utility power system. In some examples, the utility 102 can be a utility company. The utility 102 can provide power to a consumer. The consumer can be, for example, a data center. The utility 102 can provide power comprising 162,000 volts (V), 13,000 V, or a different range of volts.

A data center references a facility used to house computer systems and associated components such as telecommunication systems and storage system. For example, a data center can include air conditioners, UPSs, servers, storage devices, and/or network switches, among other possible components of a data center. The data center can receive the power at the transformer 104. Although the examples provided herein are given in the context of a data center, the examples described are not limited to data centers but can be applied in a plurality of different contexts utilizing power.

The transformer 104 can be a static electrical device that transfers electrical energy between two or more circuits through electromagnetic induction. The transformer 104 can receive power having a first voltage and can transform the received power to a power having a second voltage. For example, the transformer 104 can receive power having 13,000 V and can transform the received power to a power having 480 V. In the example shown in FIG. 1, the transformer 104 can provide power having 480 V alternating current (AC).

The transformer 104 can provide power to the loads 106-1 and 106-2 which are referred to as loads 106. The loads 106 include electronic components or portions of a circuit that consume electric power. The loads 106-2 can include loads with smart power supplies. Smart power supplies include programmable power supplies that are capable of modifying how a load consumes power.

The loads can be linear loads or non-linear loads. An impedance of a linear load does not change with an applied voltage. The impedance of a non-linear load changes with an applied voltage. Changing impedance means that the current drawn by the non-linear load may not be sinusoidal even if it is connected to a sinusoidal voltage. The non-sinusoidal currents contain harmonic currents that interact with the impedance of the power distribution system to create voltage distortions that can affect both the utility 102, the system 100, and the loads 106 receiving power from the utility 102.

References to the loads 106 can include references to one or more of the loads 106. References to the loads 106 can also include references to the smart power supplies. For example, providing adjustments to the loads 106-2 can include providing adjustments to one or more of the loads and/or providing adjustments to one or more of the smart power supplies corresponding to the loads 106-2.

Smart power supplies can include digital power factor correction controllers. The digital power factor correction controllers can regulate their input current to match a current reference. The current reference can be measured from the input voltage. The current reference can also be generated by the digital power factor correction controller itself. The digital power factor correction controller can process the current reference based on power correction controller commands. Commands can set a harmonic provided by a load, where the harmonic has an amplitude and a phase. Commands may also comprise a phase shift to the overall current reference or a non-linear change can be used to adjust a power factor between a leading power factor and a lagging power factor.

The sensor 108 can measure a voltage and a current provided by the utility 102 and received at the transformer 104. The sensor 108 can provide the measurements to the power correction controller 110. In some examples, the sensor 108 can include a plurality of sensors. For example, the sensor 108 can include a current sensor and a voltage sensor.

The power correction controller 110 can process the measurements (e.g., voltage measurements and current measurements) to calculate a power factor and/or harmonic content of the input power, among other calculations that can be used to program the smart power supplies of the loads 106-2. For example, the power correction controller 110 can also determine harmonic content, phase error, and leading/lagging of the load being presented to the utility 102.

As used herein, a leading power factor references a phase of the current that is leading a phase of a voltage of a power. A lagging power factor references a phase of the current that is lagging a phase of the voltage of a power.

The power correction controller 110 can receive inputs from a customer and/or from a smart power supply. The inputs can be used to determine whether to adjust the consumption of the loads 106-2 or whether to refrain from adjusting the consumption of the loads 106-2. For example, the power correction controller 110 can receive a plurality of thresholds and/or metrics that can be used to determine whether to adjust the consumption of the loads 106-2. The plurality of the thresholds and/or the metrics can be provided by a user and/or can be learned by the power correction controller 110 and/or a different component of the system 100. The metrics can include, for example, a harmonics profile and/or a power factor profile. The harmonics profile can describe an acceptable range of harmonics. The power factor profile can describe an acceptable range of power factors. A harmonics profile can include an amplitude and/or a phase.

The loads 106-2 through the smart power supply can provide feedback to the power correction controller 110. The feedback can include input current received at the loads 106-2. The input current can be used to determine whether adjustment to the smart power supply can change the consumption of power such that the thresholds and/or the metrics are met. Other data provided from the smart power supply to the power correction controller 110 can include telemetry data.

Telemetry data can include a temperature of the loads 106-2 and/or the smart power supply and a power consumed by the load 106-2. A temperature of the loads 106-2 and/or the smart power supply can be used to determine whether the loads 106-2 are capable of receiving and/or implementing adjustments. For example, a temperature that is greater than a temperature threshold can indicate that a load from the loads 106-2 is incapable of implementing adjustment given that the load is overheated and/or is in the process of overheating.

The power consumed by the load 106-2 can be used to prioritize the adjustment of the loads 106-2. For example, if the power consumed by a first load from the loads 106-2 is greater than a power consumed by a second load from the loads 106-2, then the power correction controller 110 can calculate and provide an adjustment to the first load and not the second load. The size of the load can be used to determine an impact of the adjustments on the harmonics and power factor. The smart power supply can also provide other data pertinent to determining whether to adjust the power consumption of the loads 106-2. In some examples, the data provided by the smart power supply and to the power correction controller 110 can be used to calculate the adjustments.

The smart power supply can also provide non-telemetry data. The non-telemetry data can be used to approve the adjustment of the power consumption of one or more of the loads 106. For example, non-telemetry data can approve the adjustments of specific loads from the loads 106 such that the power correction controller 110 can provide the adjustments to some loads but not others. The non-telemetry data can also define a schedule under which adjustments can be made to the loads 106-2. For example, the non-telemetry data can define that adjustments may not be made during peak usage or can limit adjustments to specific times of the day.

In some examples, the power correction controller 110 can generate adjustments based on the measurements and the metrics. For example, the power correction controller 110 can access a plurality of metrics. The power correction controller 110 can also receive the measurements. The power correction controller 110 can determine whether measurements meet the metrics. If the measurements meet the metrics, then the power correction controller 110 can refrain from generating and providing adjustments. If the measurements do not meet the metrics, then the power correction controller 110 can generate and provide adjustments to the loads 106.

For example, the power correction controller 110 can calculate the harmonic content of the power provided to/from the transformer 104. The harmonic content of the power can be compared to a desired harmonic content. If the harmonic content is within the scope of the desired harmonic content, then the power correction controller 110 can refrain from calculating and/or providing adjustments to the loads 106-2. If the harmonic content is not within the scope of the desired harmonic content, then the power correction controller 110 can provide adjustments to add out of phase harmonics to the input currents to cancel out at least some of the harmonic content that is not within the scope of the desired harmonic content. The harmonic content can be out of scope of the desired harmonic content if at least one of the loads 106 is an inductive non-linear load. In some examples, the loads 106-2 can be adjusted to cancel out harmonic content generated by the loads 106-1.

The power correction controller 110 can also determine, from the voltage measurements and/or the current measurements, a power factor of the power provided to the transformer 104. The power correction controller 110 can also compare the power factor to a desired power factor profile to determine whether the power factor is within the scope of the desired power factor profile. If the power factor is within the desired power factor profile, then the power correction controller 110 can refrain from generating and/or providing adjustments to the load. If the power factor is not within the desired power factor profile, then the power correction controller 110 can generate and provide adjustments to the loads 106-2. For examples, the power correction controller 110 can program or instruct the smart power supply(s) of the loads 106-2 to adjust the phase of their current reference to adjust the phase of the datacenter.

As used herein, a current reference is a waveform that the smart power supply is creating for the input current. In some examples, the current reference is sinusoidal and in phase with the input voltage. A change to the phase of the reference affects the phase of the input current. Adding harmonic content to the current reference affects the harmonic content of the input current.

The power correction controller 110 can also determine, from the voltage measurements and/or the current measurements, a phase shift of the power provided to the transformer 104. The power correction controller 110 can also compare the phase shift to a desired phase shift profile to determine whether the phase shift is within the scope of the desired phase shift profile. If the phase shift is within the desired phase shift profile, then the power correction controller 110 can refrain from generating and/or providing adjustments to the load. If the phase shift is not within the desired phase shift profile, then the power correction controller 110 can generate and provide adjustments to the loads 106-2.

The power correction controller 110 can also determine, from the voltage measurements and/or the current measurements if the power provided to the transformer 104 has a leading power factor. If the power provided to the transformer 104 has a leading power factor and the loads 106-2 utilize a lagging power factor, then the power correction controller 110 can adjust the references of the loads 106-2 non-linearly to create a lagging power factor.

The power correction controller 110 can further determine, from the voltage measurements and/or the current measurements if the power provided to the transformer 104 has a lagging power factor. If the power provided to the transformer 104 has a lagging power factor and the loads 106-2 utilize a leading power factor, then the power correction controller 110 can adjust the current references of the loads 106-2 non-linearly to create a leading power factor.

In some examples, there are tradeoffs between the adjustments. That is, not all adjustments may achieve their intended effect if implemented simultaneously. For example, to create a lagging power factor when the power factor is leading, may include adding some distortion to the current. Adding distortion to the current can prevent the minimizing of harmonics in creating a lagging power factor.

In some examples, the power correction controller 110 can access a hierarchy of adjustments. The hierarchy of adjustments can prioritize the adjustments provided to the loads 106-2. For example, the hierarchy of adjustments can prioritize adjustments to create leading power factors over adjustments to minimize harmonics. In such an example, the power correction controller 110 can first provide adjustment to create a leading power factor and can secondly provide adjustments to maintain the other metrics such as minimizing harmonics without interrupting with adjustments having a higher priority. The hierarchy of adjustments can be provided by a user and/or can be learned.

Another example of the prioritization of adjustments is the prioritization of adjustments creating a lagging power factor when the power source is a generator. For example, the power correction controller 110 can minimize harmonics when on a utility power supply and can create lagging power factors when on a generator power supply. That is, the prioritization of the adjustments can be dependent of other factors such as load factors, smart power supply factors, and power supply factors.

Figure 2:
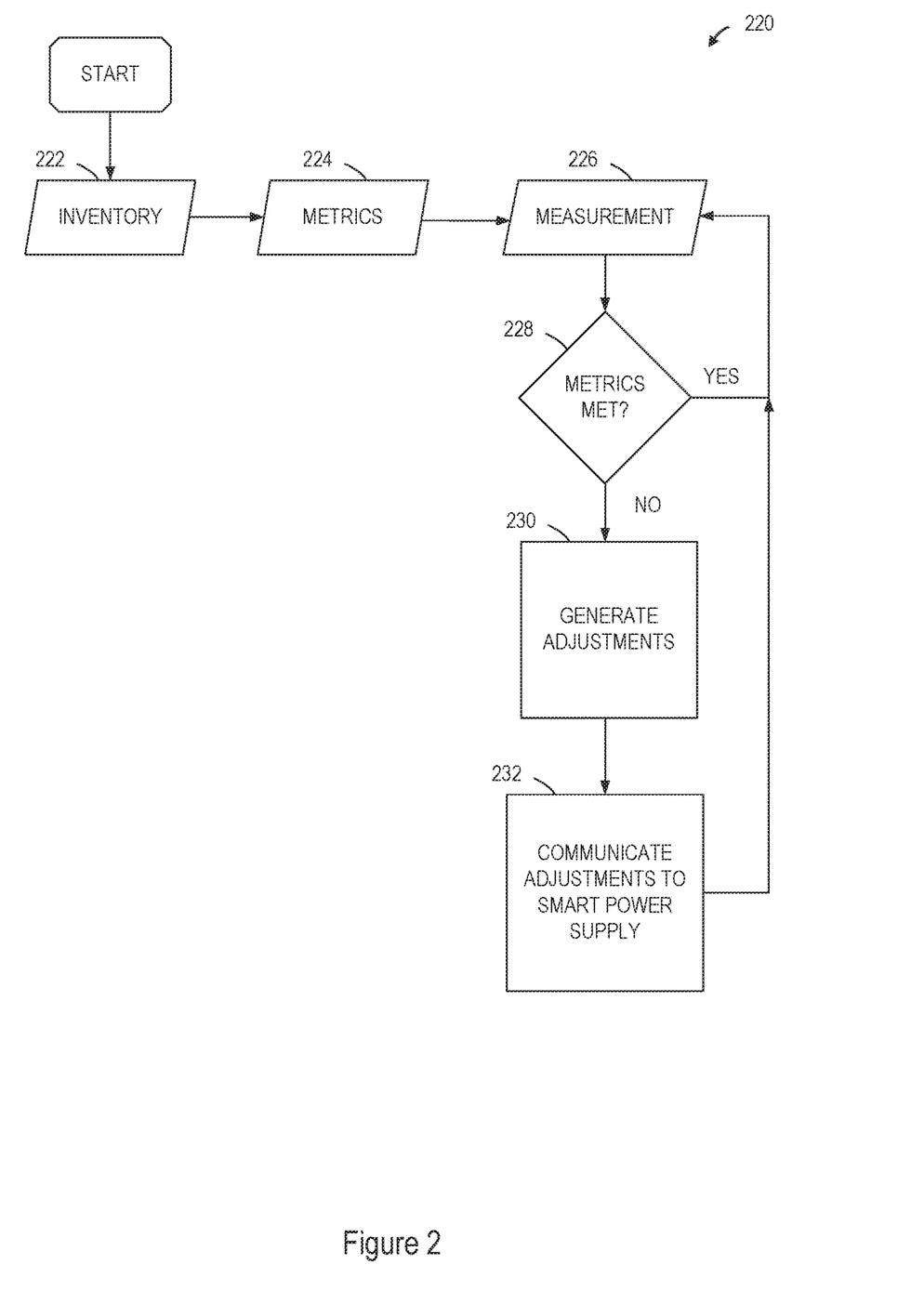
FIG. 2 illustrates an example of a flow diagram for generating adjustments for power consumption consistent with the disclosure.

FIG. 2 illustrates an example of a flow diagram 220 for generating adjustments for power consumption consistent with the disclosure. At block 222, the flow diagram 220 includes generating an inventory of the power distribution system. Generating the inventory can include requesting and/or receiving device identifiers (IDs) and/or capabilities. For example, the inventory can include a sensor, a transformer, and a plurality of loads comprising smart power supplies.

Responsive to generating the inventory at block 222, the flow diagram 220 can access metrics 224. The metrics can be accessed independent of the inventory or in view of the inventory. For example, the metrics can be customized for the inventory and/or the capabilities of the inventory.

At block 226, the power provided to a transformer of the power distribution system can be measured. The measurements, including voltage measurements and current measurements, can be used to generate a plurality of values. The plurality of values can include harmonic values and/or power factor values. As used herein, harmonic values can describe harmonic content. For example, the harmonic content can have a number of harmonic values that that describe different harmonics that comprise the harmonic content. As such, references to harmonic values can include references to one or more harmonic values.

At block 228, a determination can be made as to whether the metrics are met. Metrics can be met if the corresponding values are within a range associated with a metric. For example, if a power factor profile defines power factors greater than 0.85 then a power factor of 0.87 can meet the metric defined by the power factor profile. If it is determined that the plurality of values meet the metrics, then the flow diagram 220 can continue to generate additional measurements 226. If it is determined that the plurality of values do not meet the metrics, then the flow diagram 220 can proceed to block 230.

At block 230, adjustments can be generated. The adjustments can be generated based on the values generated from the measurements and the metrics. The adjustments can be provided to adjust the consumption of power by the loads such that the metrics are met. At block 232, the adjustments are communicated to the smart power supply of a corresponding load. The flow diagram 220 can continue to block 226.

In some examples, the power distribution system can be a feedback system. For examples, at block 230, the power correction controller can generate the adjustments in view of previously generated and communicated adjustments. For example, the controller can generate a different adjustment than a previously generated adjustment if the previously generated adjustment did not result in the metrics being met. As such, the result of implementing a previously generated adjustment can be used in generating future adjustments. In some examples, the power correction controller can utilize the results of N previous adjustments to generate a present adjustment. For example, if four loads exist and two of the loads have received adjustments without qualifying the metrics, then a power correction controller can generate an adjustment for one or more of the other two loads that have not received adjustments. The power correction controller can also generate a same adjustment, as a prior adjustment(s), with different magnitudes provided that the prior adjustment did not result in the metrics being met.

Figure 3:
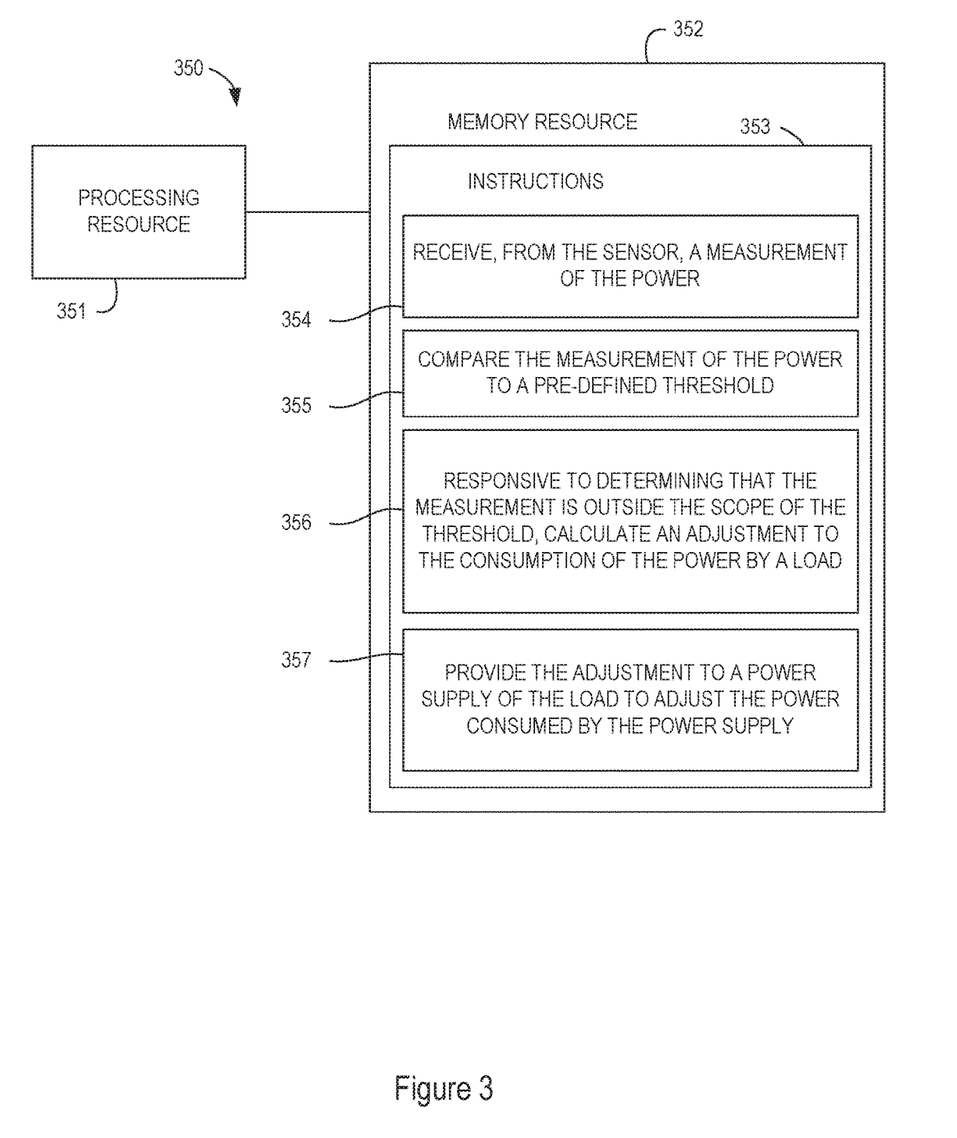
FIG. 3 illustrates an example of an apparatus for generating adjustments for power consumption consistent with the disclosure.

FIG. 3 illustrates an example of an apparatus for generating adjustments for power consumption consistent with the disclosure. As shown in FIG. 3, the apparatus 350 includes a processing resource 351 and a memory resource 352.

The processing resource 351 may be a hardware processing unit such as a microprocessor, application specific instruction set processor, co-processor, network processor, or similar hardware circuitry that can cause machine-readable instructions to be executed. In some examples, the processing resource 351 may be a plurality of hardware processing units that can cause machine-readable instructions to be executed. The processing resource 351 can include central processing units (CPUs) and/or graphics processing units (GPUs), among other types of processing units. The memory resource 352 may be any type of volatile or non-volatile memory or storage, such as random access memory (RAM), flash memory, read-only memory (ROM), storage volumes, a hard disk, or a combination thereof.

The memory resource 352 may store instructions 353 thereon. When executed by the processing resource 351, the instructions 353 may cause the apparatus 350 to perform specific tasks and/or functions. For example, at block 354, the memory resource 352 may store instructions 353 which may be executed by the processing resource 351 to cause the apparatus 350 to receive, from the sensor, a measurement of the power. At block 355, the memory resource 352 may store instructions 353 which may be executed by the processing resource 351 to compare the measurement of the power to a pre-defined threshold. At block 356, the memory resource 352 may store instructions 353 which may be executed by the processing resource 351 to, responsive to determining that the measurement is outside the scope of the threshold, calculate an adjustment to the consumption of the power by a load. At block 357, the memory resource 352 may store instructions 353 which may be executed by the processing resource 351 to cause the apparatus 350 to provide the adjustment to a power supply of the load to adjust the power consumed by the power supply.

The memory resource 352 can also store instructions to provide the adjustment including at least one of a harmonics adjustment, a phase shift adjustment, and a current reference adjustment corresponding to the power consumed by the power supply. The power supply can be a smart power supply capable of controlling the consumption of power.

The memory resource 352 can also store instructions to receive telemetry data corresponding to the operation of the load. The telemetry data includes at least one of temperature data and power data describing the data consumed by the load. For example, the telemetry data can include measurements of the temperature and measurements of the power consumed by the load.

The memory resource 352 can include instructions to determine whether the at least one of the temperature data and the power data indicate that the load is capable of receiving the adjustment. Responsive to determining that the at least one of the temperature data and the power data indicate that the load is not capable of receiving adjustments, a power correction controller can refrain from providing the adjustment. Responsive to determining that the at least one of the temperature data and the power data indicate that the load is capable of receiving adjustments. In some examples, the controller can also provide the adjustment to the power supply based on a determination that the load is one of a plurality of loads that has been approved for programming. A load can be approved for programming by being approved to receive the adjustments. That is, receiving the adjustments, at the load, through a series of commands can comprise a programming of the load and/or the smart power supply of the load.

Figure 4:
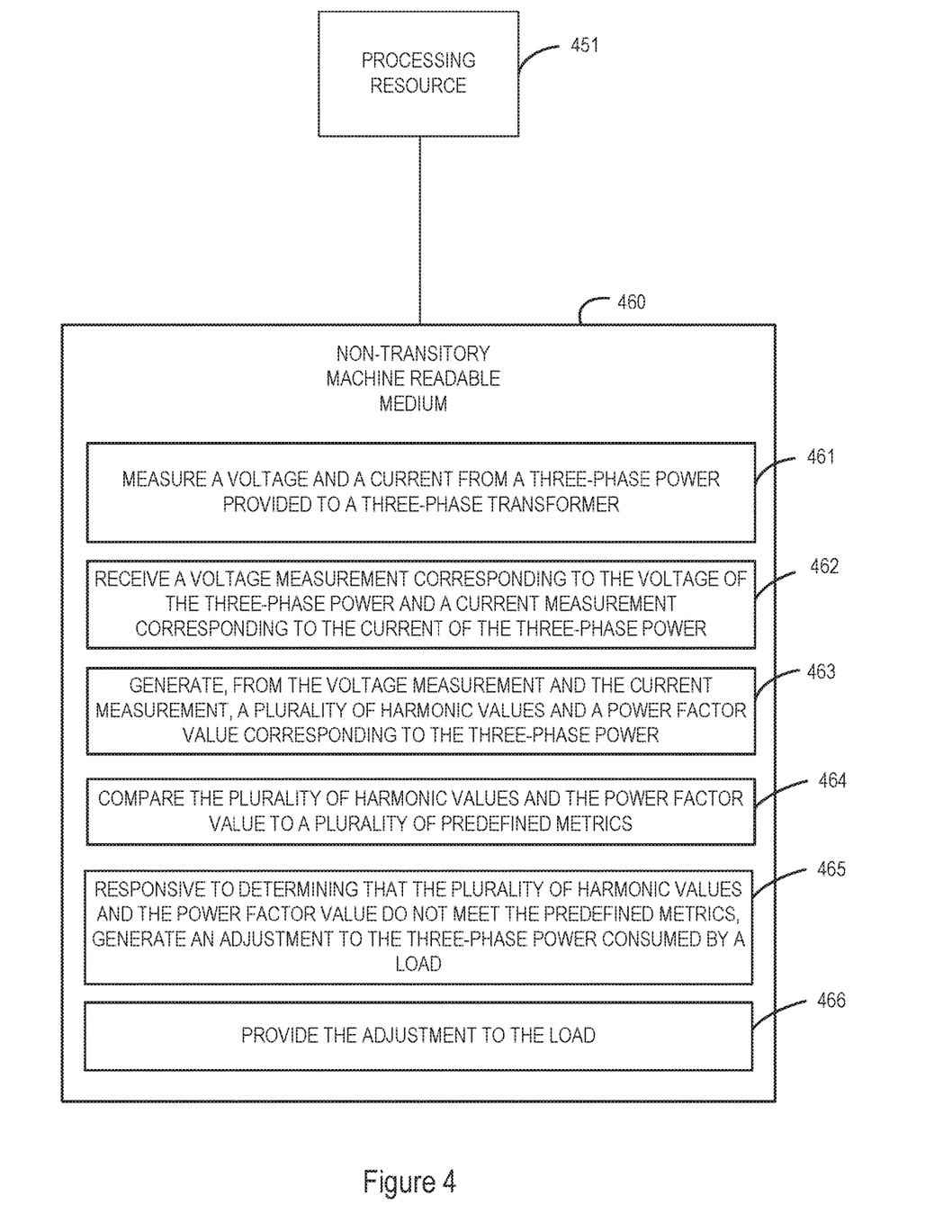
FIG. 4 illustrates an example non-transitory machine-readable medium for generating adjustments for power consumption consistent with the disclosure.

FIG. 4 illustrates an example non-transitory machine-readable medium for generating adjustments for power consumption consistent with the disclosure. A processing resource 451 may execute instructions stored on the non-transitory machine readable medium 460. The non-transitory machine readable medium 460 may be any type of volatile or non-volatile memory or storage, such as random access memory (RAM), flash memory, read-only memory (ROM), storage volumes, a hard disk, or a combination thereof.

The example medium 460 stores instructions 461 executable by a processing resource to measure a voltage and a current from a three-phase power provided to a three-phase transformer. The example medium 460 stores instructions 462 executable by a processing resource to receive a voltage measurement corresponding to the voltage of the three-phase power and a current measurement corresponding to the current of the three-phase power. The example medium 460 stores instructions 463 executable by the processing resource to generate, from the voltage measurement and the current measurement, a plurality of harmonic values and a power factor value corresponding to the three-phase power. The example medium 460 stores instructions 464 executable by the processing resource to compare the plurality of harmonic values and the power factor value to a plurality of predefined metrics. The example medium 460 stores instructions 465 executable by the processing resource to, responsive to determining that the plurality of harmonic values and the power factor value do not meet the predefined metrics, generate an adjustment to the three-phase power consumed by a load. The example medium 460 stores instructions 466 executable by the processing resource to provide the adjustment to the load.

In some examples, the plurality of predefined metrics can be learned and/or can be selected manually. The instructions can be executable to receive phase data corresponding to load, wherein the phase data identifies a phase utilized by the load. The instructions can be executable to generate the adjustment utilizing the phase data. That is the instructions can generate adjustments corresponding to a phase. For example, a first adjustment can correspond to a first phase and a second adjustment can correspond to a second phase. As such, the measurements of the voltage and the current can include measurements corresponding to specific phases of the input power. As such, the adjustments can be implemented on the corresponding phases independently. For example, the first adjustment can be implemented to affect the first phase while the second adjustment can be implemented to affect the second phase. The voltage and the current can be remeasured to generate an updated voltage measurement and an updated current measurement. A power consumption controller can recalculate an adjustment in view of updated voltage measurement and the updated current measurement.

Figure 5:
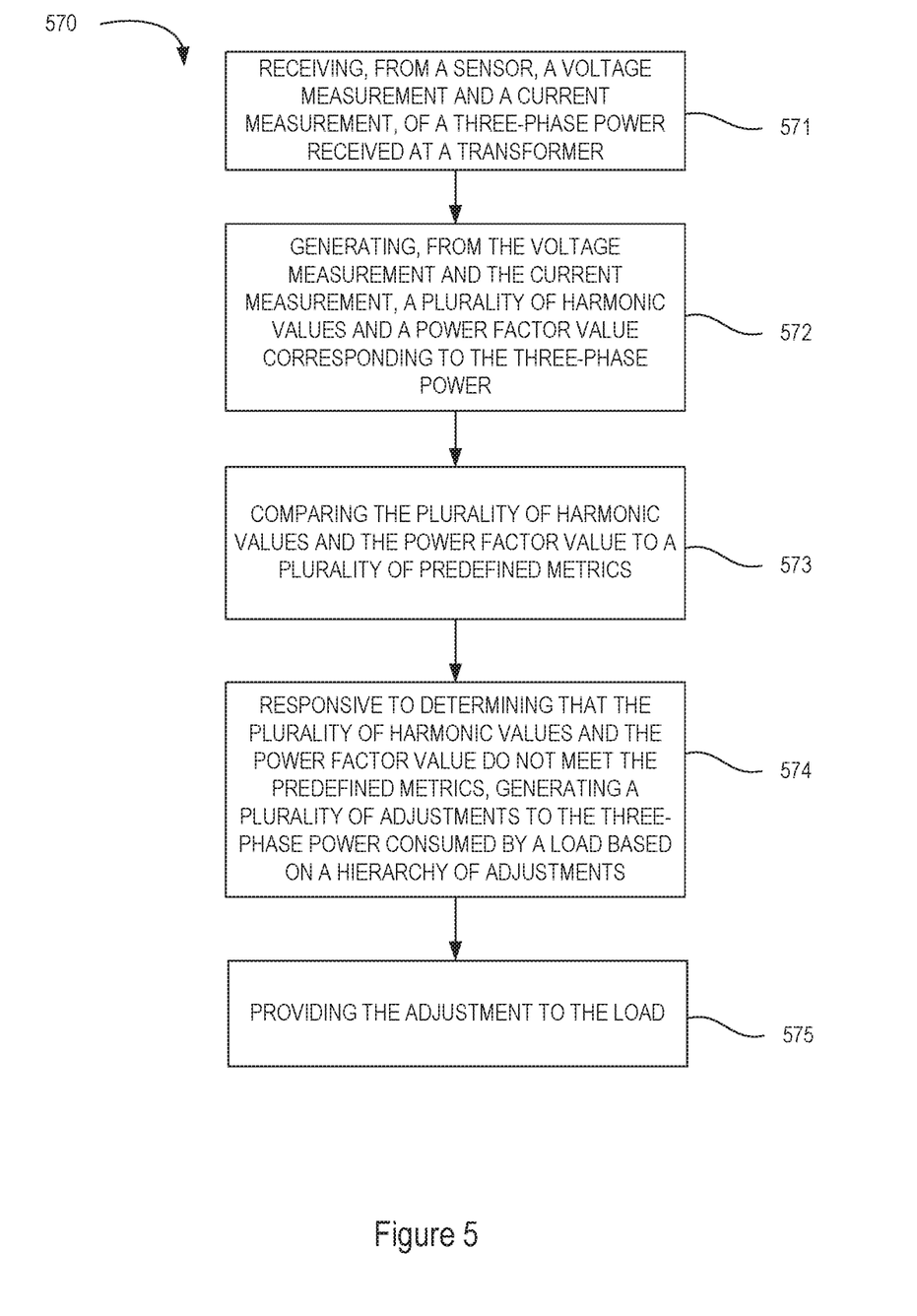
FIG. 5 illustrates an example flow diagram of a method for generating adjustments for power consumption consistent with the disclosure.

FIG. 5 illustrates an example flow diagram of a method for generating adjustments for power consumption consistent with the disclosure. At block 571, the method 570 includes receiving, from a sensor, a voltage measurement and a current measurement, of a three-phase power received at a transformer. At block 572, the method 570 includes generating, from the voltage measurement and the current measurement, a plurality of harmonic values and a power factor value corresponding to the three-phase power. At block 573, the method 570 includes comparing the plurality of harmonic values and the power factor value to a plurality of predefined metrics. At block 574, the method 570 includes, responsive to determining that the plurality of harmonic values and the power factor value do not meet the predefined metrics, generating a number of adjustments to the three-phase power consumed by a load based on a hierarchy of adjustments. At block 576, the method includes providing the adjustment to the load.

In some examples, the hierarchy of adjustments prioritize adjustments. The prioritized adjustments can include a number of harmonic adjustments and/or a phase shift adjustment.

In some examples, responsive to determining that at least one of the plurality of harmonic values is greater than one or more harmonic thresholds, the method 570 can include adding out of phase harmonics to a current of the three-phase power to cancel out a non-linear power consumed by the load. The method 570 can also, responsive to determining that the three-phase power is leading, provide a non-linear adjustment to create a lagging power factor in the three-phase power consumed by the load. The method 570 can further, responsive to determining that the three-phase power is lagging, provide a non-linear adjustment to create a leading power factor in the three-phase power consumed by the load.

In the foregoing detailed description of the disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the disclosure. As used herein, designators such as "N", etc., particularly with respect to reference numerals in the drawings, indicate that a number of the particular feature so designated can be included. A "plurality of" is intended to refer to more than one of such things.

What is claimed:

1. An apparatus comprising:
   a sensor to measure power received at a transformer; and
   a controller to:
   receive, from the sensor, a measurement of the power;
   compare the measurement of the power to a pre-defined threshold;
   responsive to determining that the measurement is outside the scope of the threshold, calculate an adjustment to the consumption of the power by a load; and
   provide the adjustment to a power supply of the load to adjust the power consumed by the power supply,
   wherein the controller is further to provide the adjustment including at least one of a harmonics adjustment and a phase shift adjustment corresponding to the power consumed by the power supply.

2. The apparatus of claim 1, wherein the controller is further to receive telemetry data corresponding to an operation of the load.

3. The apparatus of claim 2, wherein the telemetry data includes at least one of temperature data and power data describing the power consumed by the load.

4. The apparatus of claim 3, wherein the controller is further to determine whether the at least one of the temperature data and the power data indicate that the load is capable of receiving the adjustment.

5. The apparatus of claim 4, wherein the controller is further to refrain from providing the adjustment based on a determination that the at least one of the temperature data and the power data indicate that the load is not capable of receiving the adjustment.

6. The apparatus of claim 4, wherein the controller is further to provide the adjustment based on a determination that the at least one of the temperature data and the power data indicate that the load is capable of receiving the adjustment.

7. The apparatus of claim 1, wherein the controller is further to provide the adjustment to the power supply based on a determination that the load is one of a plurality of loads that have been approved for programming.

8. A non-transitory machine-readable medium storing instructions executable by a processing resource to:
   measure a voltage and a current from a three-phase power provided to a three-phase transformer;
   receive a voltage measurement corresponding to the voltage of the three-phase power and a current measurement corresponding to the current of the three-phase power;
   generate, from the voltage measurement and the current measurement, a plurality of harmonic values and a power factor value corresponding to the three-phase power;
   compare the plurality of harmonic values and the power factor value to a plurality of predefined metrics;
   responsive to determining that the plurality of harmonic values and the power factor value do not meet the predefined metrics, generate an adjustment to the three-phase power consumed by a load; and
   provide the adjustment to the load.

9. The non-transitory machine-readable medium of claim 8, wherein the plurality of predefined metrics are learned.

10. The non-transitory machine-readable medium of claim 8, wherein the plurality of predefined metrics are selected manually.

11. The non-transitory machine-readable medium of claim 8, wherein the instructions are further executable to receive phase data corresponding to load, wherein the phase data identifies a phase utilized by the load.

12. The non-transitory machine-readable medium of claim 11, wherein the instructions are further executable to generate the adjustment utilizing the phase data.

13. The non-transitory machine-readable medium of claim 8, wherein the instructions are further executable to remeasure the voltage and the current to generate an updated voltage measurement and an updated current measurement.

14. The non-transitory machine-readable medium of claim 13, wherein the instructions are further executable to provide a recalculated adjustment in view of updated voltage measurement and the updated current measurement.

15. A method comprising:
    receiving, from a sensor, a voltage measurement and a current measurement, of a three-phase power received at a transformer;

generating, from the voltage measurement and the current measurement, a plurality of harmonic values and a power factor value corresponding to the three-phase power;

comparing the plurality of harmonic values and the power factor value to a plurality of predefined metrics;

responsive to determining that the plurality of harmonic values and the power factor value do not meet the predefined metrics, generating a plurality of adjustments to the three-phase power consumed by a load based on a hierarchy of adjustments; and providing the adjustment to the load.

16. The method of claim 15, wherein the hierarchy of adjustments prioritizes adjustments and wherein the prioritized adjustments include a plurality of harmonic adjustments and a phase shift adjustment.

17. The method of claim 15, further comprising, responsive to determining that the plurality of harmonic values is greater than a harmonic threshold, adding out of phase harmonics to a current of the three-phase power to cancel out a non-linear power consumed by the load.

18. The method of claim 15, further comprising, responsive to determining that the three-phase power is leading, provide a non-linear adjustment to create a lagging power factor in the three-phase power consumed by the load.

19. The method of claim 15, further comprising, responsive to determining that the three-phase power is lagging, provide a non-linear adjustment to create a leading power factor in the three-phase power consumed by the load.

* * * * *